United States Patent
Grieco (10) Patent No.: US 11,370,690 B2
(45) Date of Patent: Jun. 28, 2022

(54) APPARATUS AND METHOD FOR MANUFACTURING GLASS PREFORMS FOR OPTICAL FIBERS

(71) Applicant: Prysmian S.p.A., Milan (IT)

(72) Inventor: Stefano Grieco, Milan (IT)

(73) Assignee: Prysmian S.p.A., Milan (IT)

(*) Notice: Subject to any disclaimer, the term of this patent is extended or adjusted under 35 U.S.C. 154(b) by 44 days.

(21) Appl. No.: 16/763,768

(22) PCT Filed: Nov. 17, 2017

(86) PCT No.: PCT/IT2017/000261
§ 371 (c)(1),
(2) Date: May 13, 2020

(87) PCT Pub. No.: WO2019/097557
PCT Pub. Date: May 23, 2019

(65) Prior Publication Data
US 2020/0361808 A1 Nov. 19, 2020

(51) Int. Cl.
*C03B 37/014* (2006.01)
(52) U.S. Cl.
CPC .... *C03B 37/0144* (2013.01); *C03B 37/01406* (2013.01)
(58) Field of Classification Search
CPC .................................................. C03B 37/0144
See application file for complete search history.

(56) References Cited

U.S. PATENT DOCUMENTS

| 6,619,074 B1* | 9/2003 | Wada ................. C03B 37/0144 65/421 |
| 2005/0199014 A1 | 9/2005 | Nakamura et al. |
| 2007/0051135 A1 | 3/2007 | Machida et al. |

FOREIGN PATENT DOCUMENTS

| CN | 1246241 C | 3/2006 |
| CN | 102815865 A | 12/2012 |
| CN | 103011577 A | 4/2013 |
| JP | H-06115966 A | 4/1994 |
| JP | 3098873 B2 | 10/2000 |

(Continued)

OTHER PUBLICATIONS

International Search Report (ISR) for PCT/IT2017/000261 dated Aug. 6, 2018 (3 pages).

(Continued)

*Primary Examiner* — Cynthia Szewczyk
(74) *Attorney, Agent, or Firm* — Shumaker, Loop & Kendrick, LLP (57) ABSTRACT

An apparatus for manufacturing glass preforms for optical fibers includes a reaction chamber surrounding a deposition region, a holding device for holding a target rod within said deposition region, one or a plurality of deposition burners positioned below said deposition region and configured to direct a high temperature flow of forming glass particles toward said target rod, a hood positioned opposite to the deposition burners with respect to said holding device and configured for discharging soot of un-deposited glass particles, said hood including at least one exhaust port provided at a first end portion thereof and side panels extending from a second end portion thereof toward said first end portion. At least a portion of the side panels of the hood is gas permeable.

19 Claims, 7 Drawing Sheets

(56) References Cited

FOREIGN PATENT DOCUMENTS

JP          2004131303 A      4/2004

OTHER PUBLICATIONS

Written Opinion (WO) for PCT/IT2017/000261 dated Aug. 6, 2018 (5 pages).
Chinese Office Action (CN OA) for CN Pat. App. No. 201780096849.5 dated Mar. 2, 2022 (16 pages).
Indian Office Action (IN OA) in IN Pat. App. No. 202017018686 dated Mar. 28, 2022 (6 pages).

* cited by examiner

APPARATUS AND METHOD FOR MANUFACTURING GLASS PREFORMS FOR OPTICAL FIBERS

TECHNICAL FIELD

The present invention relates to an apparatus and a method for manufacturing glass preforms for optical fibers.

In particular, the present invention relates to an apparatus and a method for manufacturing glass preforms by depositing glass particles on an out circumferential surface of a target rod.

BACKGROUND ART

Optical fibers for optical communication are made from high purity, silica-based glass fibers drawn from glass preforms, which preforms are produced according to various glass deposition techniques.

Some of these deposition techniques, as for example outside vapour deposition (OVD), are based on flame combustion wherein reactants (i.e. silica precursors optionally together with dopants materials for suitably modifying the refractive index of the glass) are fed together with combusting gases through a deposition burner which directs a high temperature flow of forming fine glass particles onto a rotating growing target rod.

A glass preform is thus fabricated, which is then consolidated to form a solid glass preform apt for being subsequently drawn into an optical fiber.

In an alternative deposition technique, as for example Advanced Plasma Vapor Deposition (APVD), fine synthetic or natural glass particles are fed in a plasma flame and molten and deposited onto a rotating core rod.

A solid glass preform is thereby fabricated which could be drawn subsequently into and optical fiber, without the need for a consolidation step.

The glass deposition process is typically performed in a so called "lathe", which typically comprises a reaction chamber provided with deposition burners, a mandrel for supporting, rotating and/or feeding the target rod to the deposition burners and an exhaust system such as a hood positioned above the deposition burners.

Depending on the glass deposition process utilized, a large amount of glass particles provided by burners are stuck to the peripheral surface of the target rod, while glass particles that fail to deposit on the target rod (hereinafter refers to "soot") remain suspended in the reaction chamber, or silica molten on the core rod evaporates due to the high temperatures of the process so forming suspended soot in the reaction chamber. Document US2005/0199014 discloses an apparatus for producing glass particles deposit wherein a plurality of glass particle synthesis burners are placed on a front face of a reaction vessel, and wherein at least one exhaust port is provided on a rear face of the reaction vessel. Two almost vertical wall faces extend from both sides of the exhaust port and are in contact with two side faces of the reaction vessel so that the angle between each wall face and the respective side face is 90 degrees or less. Gas ports are provided at positions close to the face where the burners are placed. The gas ports are installed symmetrically with respect to the central axes of the burners and the rotational axis of the target rod. The gas ports are directed toward the two wall faces, thereby blowing out the clean air or inert gas such as nitrogen toward the two wall faces. With this flow of fluid, glass particles not deposited are exhausted smoothly through the exhaust ports.

Document US2007/0051135 discloses a method for manufacturing a porous-glass material for optical fiber performed in a reaction apparatus having a plurality of burners for producing glass particles toward an initial base material and a ventilation mechanism at a position opposed to the plurality of burners, the method comprises the steps of moving the plurality of burners back and forth along an initial base material, depositing the glass particles produced by the flame hydrolysis reaction of the glass raw material around the initial base material, starting the deposition of a next porous glass material without removing soot stuck to the inside of the chamber after the deposition of the glass particles is completed. Under the above condition, the inside pressure of the chamber is adjusted within the range of $-80\ Pa \leq Pmin \leq -40\ Pa$, which is a pressure differential between the inside and outside of the chamber. The number of depositing soot around the target rod is not increased notwithstanding the soot stuck to the inside of the chamber is not removed after the deposition of the glass particles.

SUMMARY OF THE INVENTION

The Applicant has observed that the soot suspended in the reaction chamber and not discharged to outside by the hood, deposits and stratifies on the sloping walls of the hood.

The Applicant has observed that during the deposition process, and in particular for very long lasting processes, small aggregates of soot particles deposited on the sloping walls of the hood can detach and fall down at any time on the target rod. The fallen soot particles can affect the homogeneity of the glass deposition on the target rod by producing defects in the consolidated glass preform, such as bubbles or other, resulting in the fiber scrapping at the end of the fiber manufacturing process.

The Applicant has observed that the method according to US2007/0051135 avoids the increase of depositing glass particles inside the reaction chamber during successive deposition processes, so decreasing the suspended soot. However, the Applicant has observed that reducing the suspended soot does not prevent particles of soot from depositing on the walls of the hood and, consequently, does not prevent glass soot from falling down on the target rod.

The Applicant has further observed that the gas ports of the apparatus disclosed by document US2005/0199014 need to blow gas toward the whole surfaces of the hood. Therefore, the gas ports need to be positioned far from a first end portion of the hood (where the exhaust port is provided) and close to a second end portion of the hood (where the sloped walls of the hood contact the walls of the deposition chamber). Therefore, in order to ensure an effective gas flow that flows through the whole surfaces of the hood, the gas ports should blow gas at a significant speed and flow rate, so potentially affecting the condition inside the reaction chamber.

The Applicant has also observed that the apparatus disclosed by document US2005/0199014 is specifically designed for vapour axial deposition (VAD) processes, wherein the growth of the preform takes place in an axial direction by slowly moving upwardly (or downwardly) the target rod with respect to the burner, so being unsuitable for outside vapour deposition (OVD) processes where the growth of the preform takes place in a radial direction and the target rod is horizontally oriented.

The Applicant has tackled the problem of preventing the un-deposited soot from sticking and depositing on the hood walls during a glass deposition process on an outer circumferential surface of a target rod.

The Applicant has found that by distributing gas inlets throughout the side panels of the hood, a stream of gas can continuously and laminar flow through the hood side panels at a relative low gas flow velocity.

The Applicant realized that by providing side panels of the hood at least partially gas permeable and by maintaining the pressure inside the reaction chamber lower than the pressure outside the reaction chamber, the gas bleeding from the hood side panels creates a gas stream able to intercept the un-deposited glass soot and to convey the latter toward the exhaust port, so preventing the un-deposited glass soot to reach and adhere to the side panels of the hood.

Consistently, the present invention relates, in a first aspect thereof, to an apparatus for manufacturing glass preforms for optical fibers comprising:
a reaction chamber surrounding a deposition region;
a holding device for holding a target rod within said deposition region;
one or a plurality of deposition burners positioned below said deposition region and configured to direct a high temperature flow of forming glass particles toward said target rod;
a hood positioned opposite to the deposition burners with respect to said deposition region and configured for discharging soot of un-deposited glass particles, said hood comprising at least one exhaust port provided at a first end portion thereof and side panels extending from a second end portion thereof toward said first end portion;
wherein at least a portion of the side panels of the hood is gas permeable.

In a second aspect, the present invention relates to a method for manufacturing glass preforms for optical fibers comprising:
providing a reaction chamber surrounding a deposition region;
holding a target rod within said deposition region;
directing a high temperature flow of forming glass particles toward said target rod;
providing a hood comprising side panels and an exhaust port for discharging glass particles not adhered to said target rod to outside said reaction chamber;
providing said side panels with gas permeable portions extending for an area of at least 50% of the overall area of said side panels;
maintaining the pressure inside the reaction chamber lower than the pressure outside the reaction chamber.

Throughout this description and in the following claims, the expressions "un-deposited glass", "un-deposited glass soot", "un-deposited soot" and "glass particles not adhered" are used to indicate soot suspended in the reaction chamber due to glass particles that fail to deposit on the target rod or due to silica that evaporates from the target rod.

Throughout this description and in the following claims, the expression "preform" is used to indicate a solid rod that can be used for drawing of optical fibers therefrom.

The expression "optical fiber" is used to indicate an elongated optical element comprising an optical waveguide, constituted by an optically transmissive core, surrounded by a cladding.

The expression "silica precursors" is used to indicate reactive compounds or compositions that are used during the deposition process to react with oxygen to form oxides that can be transformed into glass layers.

The expression "dopant material" is used to indicate a compound or composition that, possibly after reaction with oxygen, when introduced or transformed into glass, becomes a dopant having an effect on the refractive index of the glass.

Throughout this description and in the following claims, the term "gas permeable", when referred to a panel or to a portion thereof, is used for indicating the capability of allowing a gas to pass through the thickness of the panel, namely to pass from one side of the panel to another side of the panel.

Preferably, said gas permeable portion of the side panels is positioned between said second end portion and said first end portion and extends for an area of at least 50% of the overall area of the side panels.

A gas permeable portion extending for at least 50% of the overall area of the side panels spreads out gas passages on a large portion of the side panels. Without wishing to be bound by any theory or explanation, this allows establishing a laminar flow over the inner surface of the side panels that effectively prevents glass soot to reach and adhere to the side panels of the hood.

Preferably, said gas permeable portion comprises a first plurality of perforations on said side panels fluidly connecting an internal environment of the reaction chamber with an external environment of said reaction chamber.

Preferably, said gas permeable portion presents a perforation density, calculated as a ratio between perforated areas and a not perforated areas, comprised between 0.2% and 15%.

As the perforation density increases, the flow rate of the flow passing through the side panels of the hood increases.

Preferably, the flow rate passing through the gas permeable portions of said side panels is set to be comprised between 5% and 20% of the overall flow rate passing through the exhaust port.

The Applicant has observed that the outcome of a vapour deposition process is not affected by flow passing through the side panels of the hood having a flow rate not exceeding 20% of the overall flow rate passing through the exhaust port.

The Applicant has also observed that flow passing through the side panels of the hood having a flow rate inferior to 5% of the overall flow rate passing through the exhaust port does not effectively prevents glass soot to adhere to the side panels of the hood.

The actual flow rate of the flow passing through the gas permeable portions is selected according to the specific vapour deposition process to be performed.

Preferably, an area of each perforation of said plurality of perforations is between 0.7 mm^2 and 15 mm^2.

Preferably, the pressure inside the reaction chamber is maintained at values comprised between 20 Pa and 200 Pa lower than the pressure outside the reaction chamber.

This allows to properly perform the vapour deposition process and to suck in gas through the gas permeable portions of the side panels of the hood from outside the reaction chamber to inside the reaction chamber.

A change in the pressure in the reaction chamber (within the cited pressure range) results in a change of the flow rate of the flow passing through the side panels of the hood. However, a change in the pressure in the reaction chamber does not require any adjustment in the flow rate passing through the side panels of the hood provided that such flow rate remains within the above cited range.

Preferably, it is provided a control device for adjusting the degree of permeability of said gas permeable portion.

By the control device, the flow rate passing through the side panels of the hood can be adjusted in case of need, as for example in case the flow rate exceeds 20% or is inferior to 5% of the overall flow rate discharged by the exhaust port, or in case a fine tuning of such a flow rate is required.

Preferably, the adjustment of the degree of permeability is performed by partially closing said first plurality of perforations.

By partially closing the area of the apertures defined by the perforations, the flow rate passing thought the perforations is reduced to an amount depending on the degree of closure of the perforations.

Preferably, said control device comprises at least one plate having a second plurality of perforations and configured to move with continuity between a minimum permeability condition, wherein said second plurality of perforations are partially superposed to said first plurality of perforations to partially close the latter, and a maximum permeability condition, wherein said second plurality of perforations are fully superposed and centered to said first plurality of perforations to leave the latter fully opened.

In this way, each side panel of the hood can be provided with a respective plate able to leave opened and to partially close the perforations of the side panel.

The second plurality of apertures provided on each plate allows a slight movement of each plate from the maximum permeability condition and the minimum permeability condition. Moreover, depending on the shape of the first plurality of perforations and of the second plurality of perforations, it is possible to achieve different degrees of fine tuning of the first perforations closure. As an example, circular or elliptical first and second plurality of perforations allow a higher degree of fine tuning in closing the first apertures than squared first and second plurality of perforations.

Preferably, the perforations of said second plurality of perforations present identical spacing, identical shape and identical area of the perforations of said first plurality of perforations.

Alternatively, said gas permeable portion is realized by one or more air filters.

In case air filters are used, as the flow rate that passes through each filter depends on the pressure drop through the filter, the filters are selected so that, given the differential pressure between outside and inside the reaction chamber, the flow rate going through all the filters is comprised between 5% and 20% of the overall flow rate discharged through the exhaust port.

BRIEF DESCRIPTION OF THE DRAWINGS

The present invention will be now described more fully hereinafter with reference to the accompanying drawings, in which some, but not all embodiments of the invention are shown.

Drawings illustrating the embodiments are not to scale representations.

For the purpose of the present description and of the appended claims, use of the "a" or "an" are employed to describe elements and components of the invention. This is done merely for convenience and to give a general sense of the invention. This description should be read to include one or at least one and the singular also includes the plural unless it is obvious that it is meant otherwise.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

Figure 1:
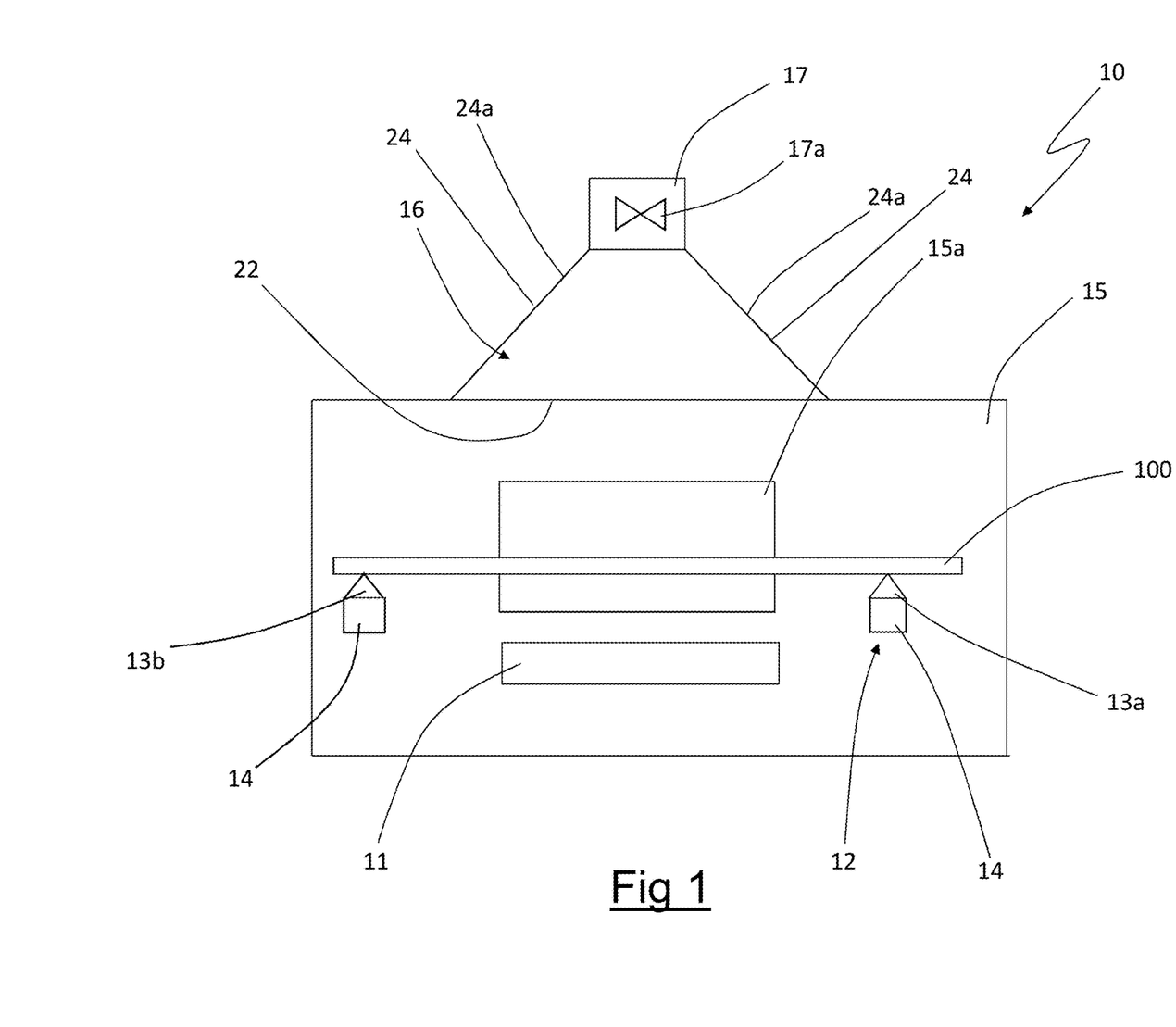
FIG. 1 shows a schematic view of an apparatus for manufacturing glass preforms for optical fibers according to the present invention.

An apparatus for manufacturing glass preforms for optical fibers according to the present invention is indicated with the reference number 10 in FIG. 1.

The apparatus 10 comprises one or a plurality of deposition burners 11 that supply a stream of forming fine glass particles for the formation of a glass preform.

A target rod 100 is held above the deposition burners 11 so as that the target rod 100 and the deposition burners 11 are relatively movable towards each other.

In the preferred embodiment of the invention, a holding device 12 rotates and translates the target rod 100 with respect to the deposition burners 11. To this end, the holding device 12 comprises a pair of chucks 13a, 13b. The chucks 13a, 13b are mounted on a lathe 14 configured to rotate the chucks 13a, 13b and translate it with respect to the deposition burners 11.

The deposition burners 11 are positioned below a deposition area 15a of a reaction chamber 15 so that the stream of forming fine glass particles is directed onto the rotating target rod 100.

Above the deposition area 15a it is provided a hood 16 comprising an exhaust port 17 for discharging outside the reaction chamber 15 a flow A of soot of glass particles not deposited onto the target rod 100.

An exhaust fan 17a is connected to the exhaust port 17 in order to depressurise the reaction chamber 15 with respect the outside environment. Additionally, a valve (not illustrated) can be connected to the exhaust port 17 or an adjustable inlet can be provided at the reaction chamber 15 for controlling the pressure in the reaction chamber 15.

Figure 2:
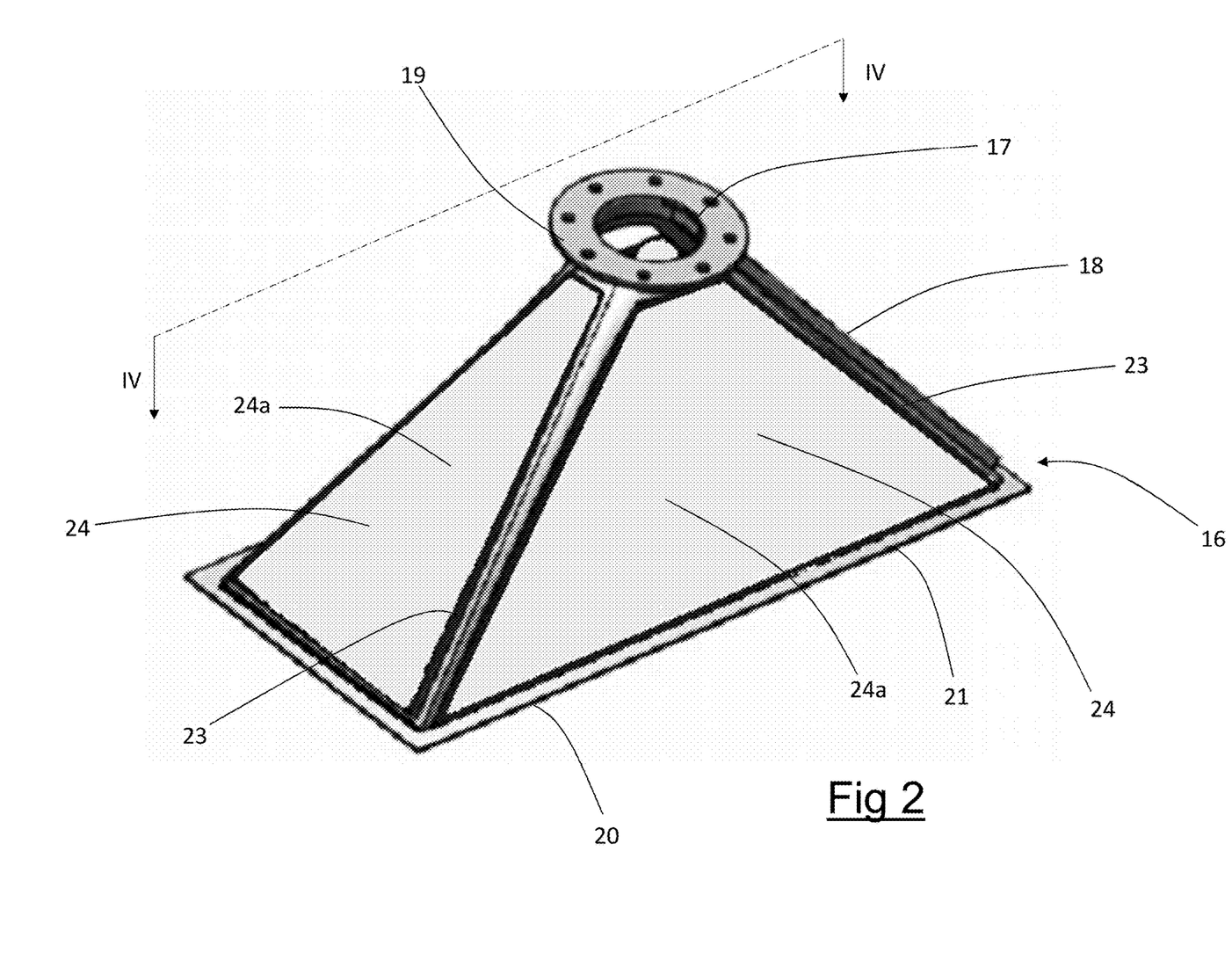
FIG. 2 shows a schematic perspective view of a component of the apparatus of FIG. 1.

As schematically illustrated in FIG. 2, the hood 16 comprises a frame 18, preferably made of metallic material such as stainless steel, extending from a first end portion 19 of the hood 16 where the exhaust port 17 is positioned to a second end portion 20 of the hood 16 opposite to the first end portion 19.

The frame 18 comprises a base structure 21 at the second end portion 20 defining an inlet port 22 for the hood 16 and a plurality of supporting bars 23 connecting the base structure 21 to the exhaust port 17.

The hood 16 has a pyramid or conical shape so that soot of glass particles entering the inlet port 22 are conveyed toward the exhaust port 17. In the preferred embodiment of the invention, the hood 16 has a rectangular frustum or truncated cone shape with the second end portion 20 bigger than the first end portion 19.

Between the first end portion 19 and the second end portion 20 the hood 16 is provided with four sloping side panels 24 supported by the frame 18. Each side panel 24 extends between two adjacent supporting bars 23 and between the base structure 21 and the exhaust port 17, as schematically depicted on FIG. 2.

The side panels 24 presents respective portions 24a that are gas permeable, namely that allows a gas to pass through the same. The gas permeable portions 24a extend for at least 50% of the overall area the side panels 24 and in the preferred embodiment of the present invention the gas permeable portions 24a substantially coincides with the whole side panels 24.

Figure 4:
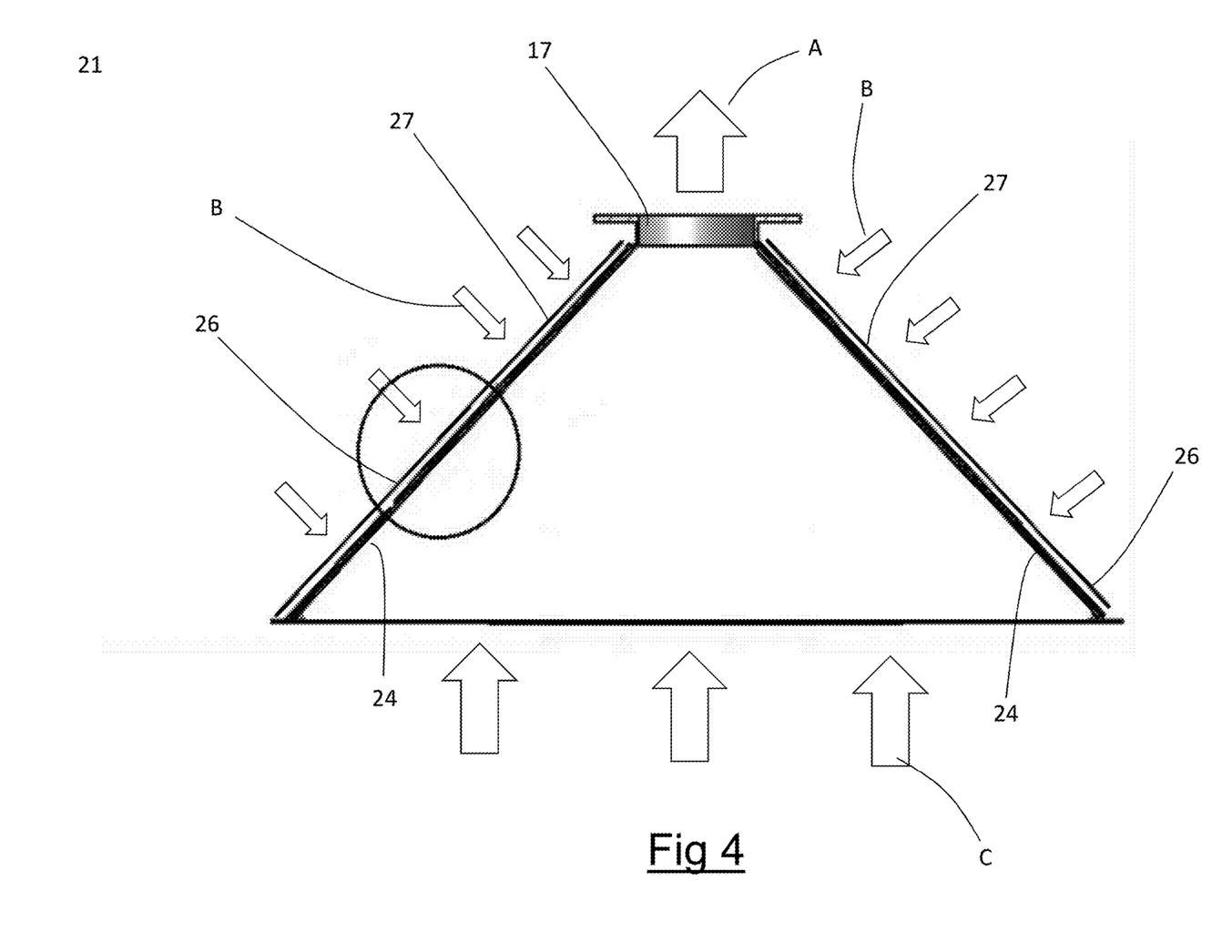
FIG. 4 shows a schematic cross section along the plane IV-IV of the component of FIG. 2.

The flow rate B (FIG. 4) passing through the gas permeable portions 24a is comprised between 5% and 20% of the overall flow rate of the discharging flow A passing through the exhaust port 17 of the hood 16.

According to an embodiment of the present invention, the gas permeable portions 24a of the side panels 24 comprises filters (not illustrated) made of porous material and preferably of HEPA type.

Figure 3:
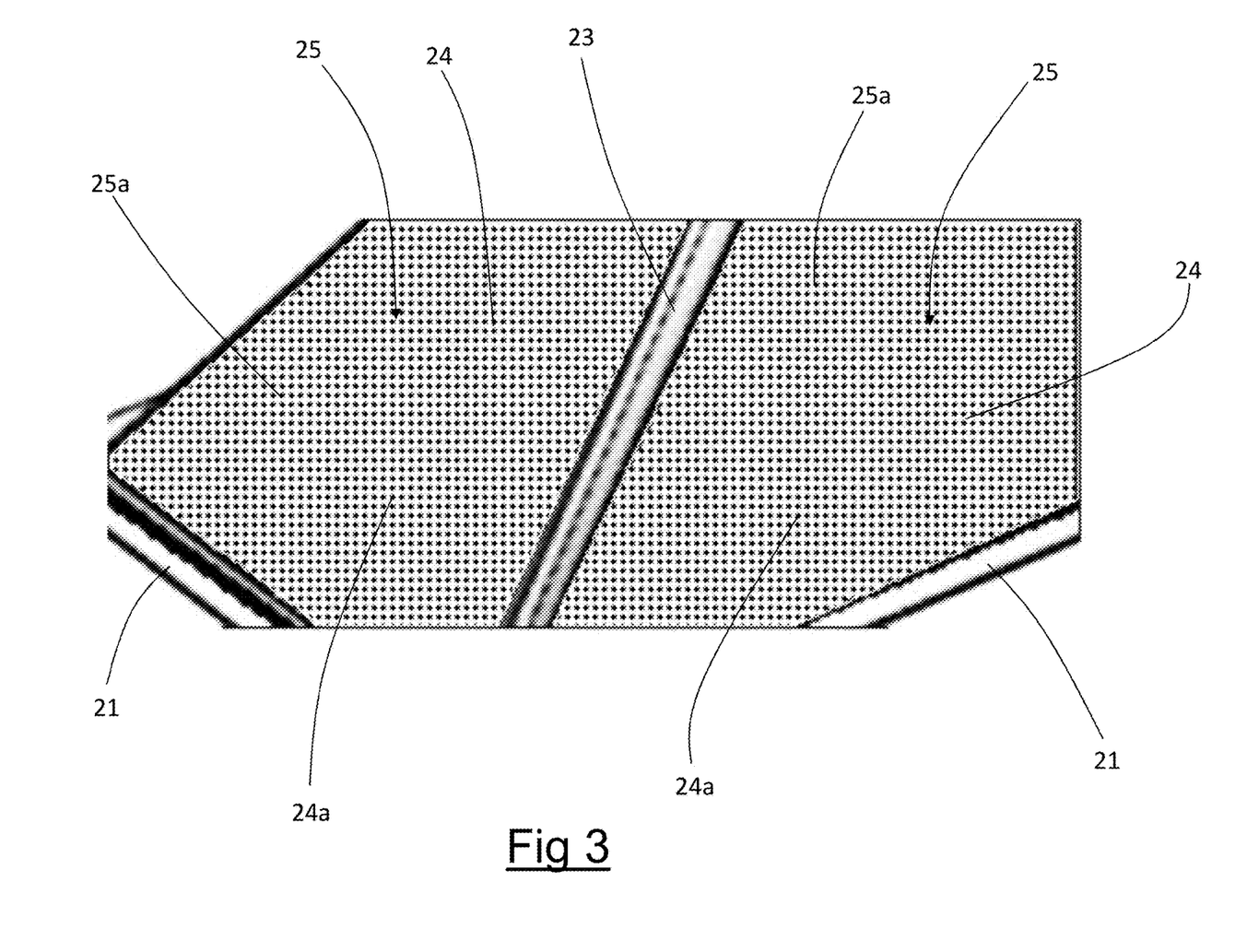
FIG. 3 shows a magnified view of some details of the component of FIG. 2.

In the preferred embodiment of the present invention, the gas permeable portions 24a comprises a first plurality of perforations 25 on the side panels 24 of the hood 18, as schematically illustrated in FIG. 3.

The first plurality of perforations 25 can for example be obtained by drilling the side panels 24, the latter being made of metallic material such as stainless steel.

Figure 7:
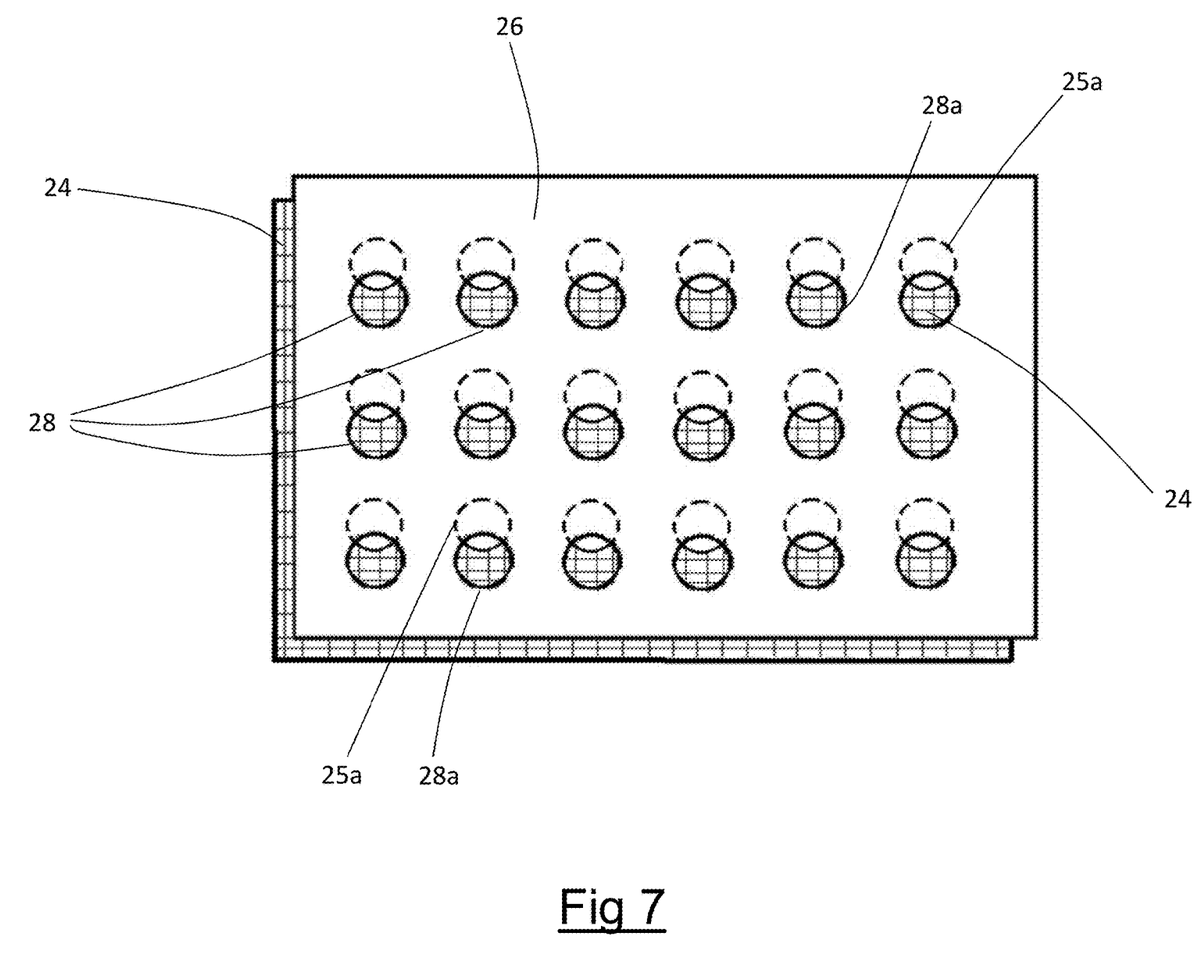
FIG. 7 shows a schematic cross section along the plane VII-VII of the details of FIG. 5.

All the perforations 25a of the first plurality of perforations 25 present the same shape and can have circular shape (as in the preferred embodiment of the invention and as illustrated in FIG. 7), or elliptical shape, or squared shape, or rectangular shape, or of any other shape.

The perforations 25a define apertures in the side panels 24 where such apertures have all the same area. The area of each aperture defined by the corresponding perforation 25a is comprised between 0.7 mm^2 and 15 mm^2. The density of the perforations 25a, namely the ratio between the area of the apertures defined by the perforation and the area of the not perforated area of the gas permeable portion 24a, is comprised between 0.2% and 15%. As an example, each perforation 25a can define an aperture of 3.14 mm^2 and one perforation 25a can be provided on each 1 cm^2 of the side panels 24, so providing a density of perforation of 3.14%.

The area of the aperture defined by a perforation 25a and the density of the perforations 25a are selected so that, given a specific differential pressure between outside and inside of the reaction chamber 15, the flow rate passing through the gas permeable portion 24a is comprised between 5% and 20% of the discharging flow A.

In the preferred embodiment of the invention, the apparatus 10 further comprises a control device 26 for adjusting the perforation density of the perforations 25a by partially closing the apertures defined by the perforations 25a.

The control device 26 comprises a plate 27 for each side panel 24. Each plate 27 is positioned onto an outwardly facing surface of the respective side panel 24. The plates 27 are slidingly mounted with respect the side panels 24 so as to move with continuity between a maximum permeability condition and a minimum permeability condition.

At the maximum permeability condition, each plate does not cover the perforations 25a of the respective side panel 24.

At the minimum permeability condition, each plate 27 partially covers the perforations 25a of the respective side panel 24.

In other words, when the plates 27 are at the maximum permeability condition the perforations 25a are not affected by the plates 27, while when the plates 27 are at the minimum permeability condition the perforations 25a are partially closed by the plates 27.

Each plate 27 comprises a second plurality of perforations 28. All the perforations 28a of the second plurality of perforations 28 present the same shape and can have circular shape, or elliptical shape, or squared shape, or rectangular shape, or of any other shape.

Figure 8:
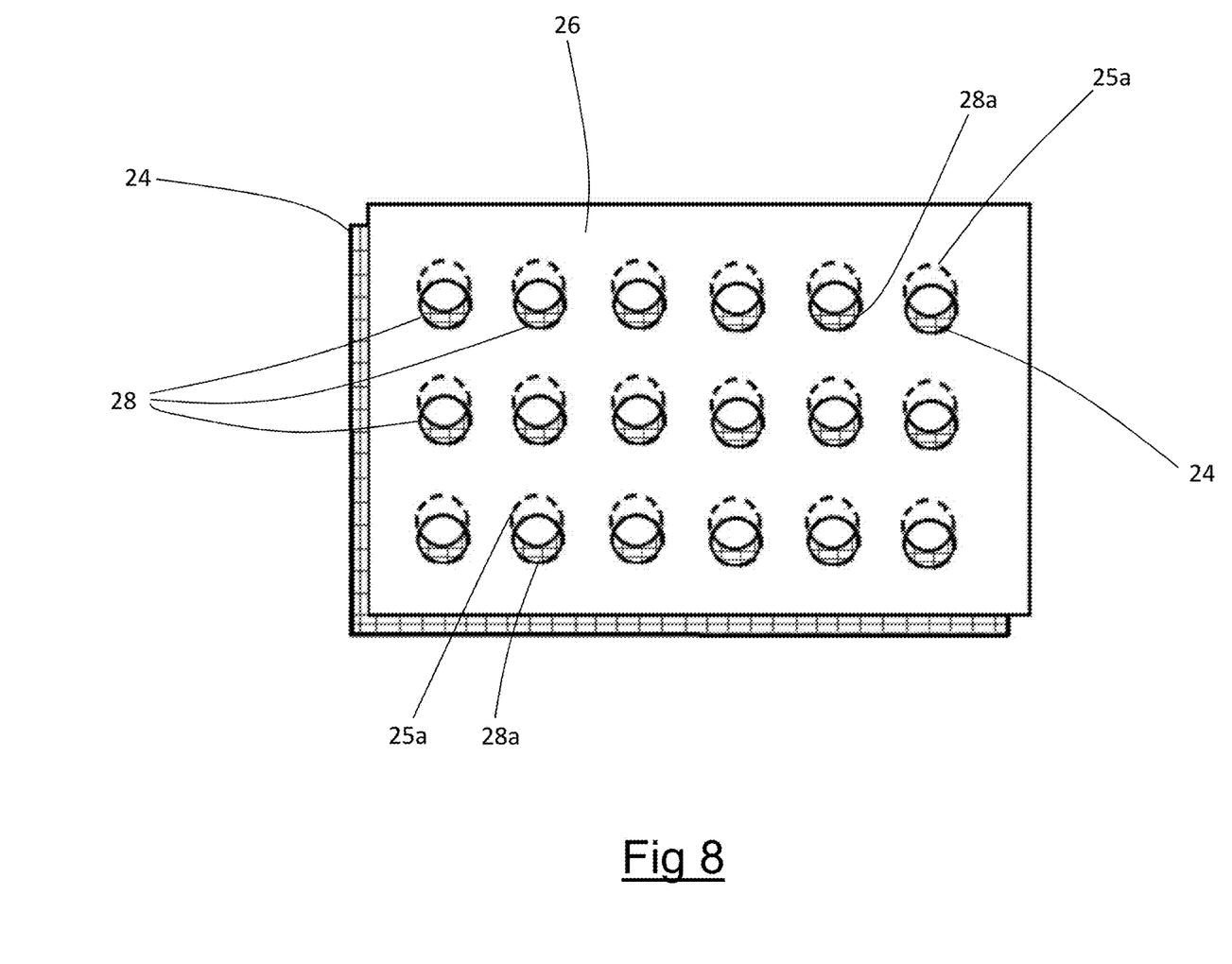
FIG. 8 shows a schematic cross section along the plane VIII-VIII of the details of FIG. 6.

The perforations 28a define apertures in the plates 27 where all the apertures have the same area. The area of each aperture defined by the corresponding perforation 28a is preferably identical to the area of the perforations 25a of the first plurality of perforations 25, as schematically illustrated in FIGS. 7 and 8. The density of the perforations 28a, namely the ratio between the area of the apertures defined by the perforation 28a and the area of the not perforated area of the plates 27, is identical to the perforation density of the first plurality of perforations 25. The number of perforations 28a of the second plurality of perforations 28 is identical to the number of perforations 25a of the first plurality of perforations 25.

As schematically illustrated in FIGS. 7 and 8, the perforations 28a of the second plurality of perforations 28 are spaced apart each other exactly as the perforations 25a of the first plurality of perforations 25 are spaced apart each other.

In particular, the perforations 28a of the second plurality of perforations 28 are arranged so that when one perforation 28a of the second plurality of perforations 28 is superposed and aligned to a perforation 25a of the first plurality of perforations 25, all the perforations 28a of the second plurality of perforations 28 are superposed and aligned to a corresponding perforation 25a of the first plurality of perforations 25.

In the maximum permeability condition of the gas permeable portions 24a, the perforations 28a of the second plurality of perforations 28 are superposed, aligned and centered to the perforations 25a of the first plurality of perforations 25, so leaving the latter fully opened.

Figure 5:
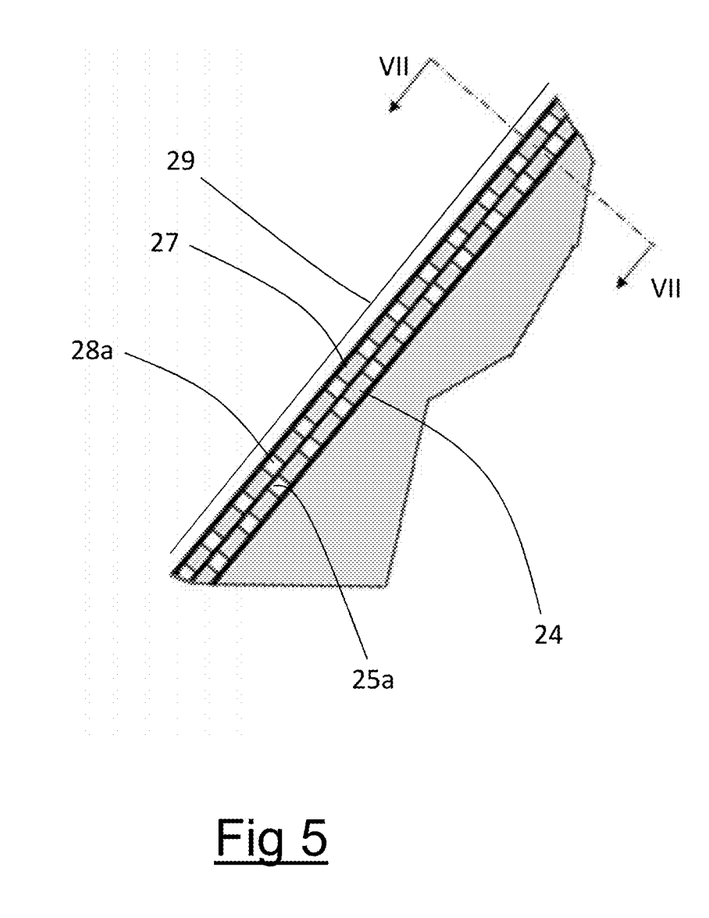
FIGS. 5 and 6 show magnified views of some details of the cross section of FIG. 4 in two different operative conditions.

FIGS. 5 and 7 schematically show a minimum permeability condition of the gas permeable portions 24a. In this condition the perforations 28a of the second plurality of perforations 28 are partially superposed to the perforations 25a of the first plurality of perforations 25, so partially closing the latter. In this condition, the flow rate B passing through the apertures 25a is reduced with respect the maximum permeability condition where the apertures of the perforations 25a of the first plurality of perforations 25 are fully opened.

Figure 6:
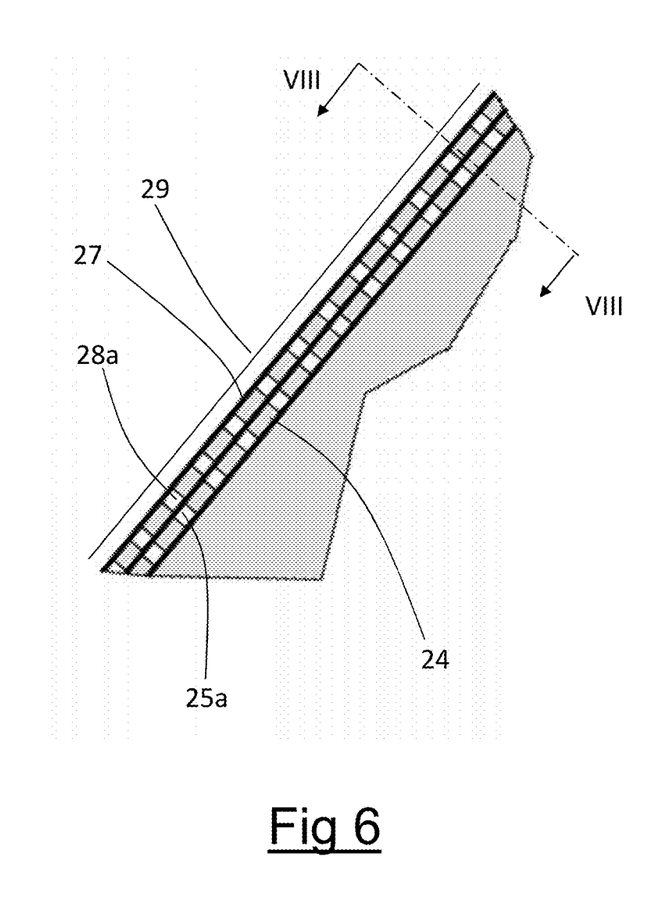

FIGS. 6 and 8 schematically show a condition comprised between the maximum permeability condition and a minimum permeability condition. In this condition, the perforations 28a of the second plurality of perforations 28 are superposed to the perforations 25a of the first plurality of perforations 25 by a superposition degree lower that the superposition degree of the minimum permeability condition. The flow rate B passing through the apertures 25a is thus reduced with respect the maximum permeability condition and is increased with respect the minimum permeability condition.

The movement of the plates 27 between the maximum permeability condition and a minimum permeability condition is performed by translating the plates 27 with respect to the side panels 24 by a length at the most equal to the diameter of a the perforation 25a of the first plurality of perforations 25.

The movement of the plates 27 can be performed by sliding the plates 27 along rails 29 (schematically illustrated in FIGS. 5 and 6) positioned along the supporting bars 23 of the frame 18 of the hood 16.

According to the method for manufacturing glass preforms for optical fibers to which the present invention relates, a glass preform is obtained from a preform formed for example by using a flame hydrolysis deposition process, preferably an outside vapor deposition (OVD) process, or by using a plasma flame deposition process, preferably an Advanced Plasma Vapor Deposition (APVD).

The growth of the preform takes place in a radial direction. To this end, the target rod 100 made of quartz glass is positioned in a fixed horizontal position and the deposition burners 11 are repeatedly passed along the surface of the growing preform for causing the radial growth of the same.

Flow rates C of reactants introduced in the deposition burners 11, may be varied during deposition of the soot or glass layers, in a way per se known, to obtain a predetermined refractive index profile in the soot preform.

During the deposition process, the pressure inside the reaction chamber 15 is maintained lower than the pressure outside the depositing chamber 15.

The pressure within the reaction chamber 15 is set at a value comprised between −20 Pa and −200 Pa with respect the pressure value of outside the reaction chamber 15.

The depression within the reaction chamber 15 creates a flow directed from the deposition burners 11 to the exhaust port 17 so that a flow A of unreacted gasses, and in particular glass soot un-deposited onto the target rod 100, is discharged through the exhaust port 17 of the hood 16.

A flow B of gas passes from outside the hood 16 to inside the hood 16 through the gas permeable portions 24a of the side panels 24 to the hood 16.

The flow B of gas entering the side panels 24 of the hood 16 generates a gas stream that, from the inside surface of the side panels 24, reaches the exhaust port 17. Such a gas stream intercepts the un-deposited glass soot and conveys the latter toward the exhaust port, so preventing the un-deposited glass soot to reach and adhere to the side panels 24 of the hood 16.

The flow rate of the flow B entering the side panels 24 is comprised between 5% and 20% of the overall flow rate of the flow A passing through the exhaust port 17.

The flow rate B entering the side panels 24 is adjustable by adjusting the degree of permeability of the gas permeable portions 24a of the side panels 24.

According to the preferred embodiment of the invention, the degree of permeability of the gas permeable portions 24a is performed by sliding the plates 27 along the side panels 24.

When the flow rate of the flow B entering the side panels 24 is too high, the plates 27 are moved in a first direction with respect to the side panels 24 so that the perforations 28a of the second plurality of perforations 28 partially close the perforations 25a of the first plurality of perforations 25, so reducing the area of the passages between outside and inside the side panels 24.

When the flow rate of the flow B entering the side panels 24 is too low, the plates 27 are moved in a second direction (opposite to the first direction) with respect to the side panels 24 so that the perforations 28a of the second plurality of perforations 28 partially open the perforations 25a of the first plurality of perforations 25, so enhancing the area of the passages between outside and inside the side panels 24.

If the pressure within the reaction chamber 15 changes during the same deposition process and reaches a new value within the above mentioned range of pressure values, the flow rate of the flow B entering the side panels 24 is adjusted only in case it exceeds the 20% of the overall flow rate of the flow A passing through the exhaust port 17 or in case it lowers the 5% of the overall flow rate of the flow A passing through the exhaust port 17.

If the pressure in the reaction chamber 15 is set to a new value (within the above mentioned range of pressure values) after the competition of a deposition process and before the beginning of a new deposition process, the plates 27 are moved with respect to the side panels 24 of the hood 16 just in case the resulting flow rate of the flow B entering the side panels 24 exceeds 20% of the overall flow rate of the flow or lowers 5% of the overall flow rate of the flow A passing through the exhaust port 17.

The invention claimed is:

1. An apparatus for manufacturing glass preforms for optical fibers comprising:
a reaction chamber surrounding a deposition region;
a holding device for holding a target rod within said deposition region;
one or a plurality of deposition burners positioned below said deposition region and configured to direct a high temperature flow of forming glass particles toward said target rod;
a hood positioned opposite to the deposition burners with respect to said deposition region and configured for discharging soot of un-deposited glass particles, said hood comprising at least one exhaust port provided at a first end portion thereof and side panels extending from a second end portion thereof toward said first end portion;
wherein at least a portion of the side panels of the hood is gas permeable and
wherein the apparatus comprises a control device for adjusting the degree of permeability of the gas permeable portion.

2. The apparatus according to claim 1, wherein said gas permeable portion of the side panels is positioned between said second end portion and said first end portion and extends for an area of at least 50% of the overall area of the side panels.

3. The apparatus according to claim 1, wherein said gas permeable portion comprises a first plurality of perforations on said side panels fluidly connecting an internal environment of the reaction chamber with an external environment of said reaction chamber.

4. The apparatus according to claim 3, wherein said gas permeable portion has a perforation density, calculated as a ratio between perforated areas and a not perforated areas, comprised between 0.2% and 15%.

5. The apparatus according to claim 3, wherein an area of each perforation of said first plurality of perforation is between 0.7 mm^2 and 15 mm^2.

6. The apparatus according to claim 1, wherein said control device acts on said first plurality of perforations for partially closing the latter.

7. The apparatus according to claim 1, wherein said control device comprises at least one plate having a second plurality of perforations and configured to move with continuity between a minimum permeability condition, wherein said second plurality of perforations are partially superposed to said first plurality of perforations to partially close the latter, and a maximum permeability condition, wherein said second plurality of perforations are fully superposed and centered to said first plurality of perforations to leave the latter fully opened.

8. The apparatus according to claim 7, wherein the perforations of said second plurality of perforations present identical spacing, identical shape and identical area of the perforations of said first plurality of perforations.

9. The apparatus according to claim 1, wherein said hood has a tapered shape.

10. The apparatus according to claim 1, further comprising an exhaust fan positioned or acting on said exhaust port.

11. The apparatus according to claim 1, wherein said gas permeable portion is realized by one or more air filters.

12. A method for manufacturing glass preforms for optical fibers comprising:
providing a reaction chamber surrounding a deposition region;
holding a target rod within said deposition region;
directing a high temperature flow of forming glass particles toward said target rod;
providing a hood comprising side panels and an exhaust port for discharging to outside said reaction chamber glass particles not adhered to said target rod;
providing said side panels with gas permeable portions extending for an area of at least 50% of the overall area of said side panels;
maintaining the pressure inside the reaction chamber lower than the pressure outside the reaction chamber;
adjusting a degree of permeability of said gas permeable portions of the side panels.

13. The method according to claim 12, comprising maintaining the pressure inside the reaction chamber at values comprised between 20 Pa and 200 Pa lower than the pressure outside the deposition chamber.

14. The method according to claim 12, further comprising setting a flow rate (B) passing through the gas permeable portions of said side panels comprised between 5% and 20% of the overall flow rate (A) passing through the exhaust port.

15. The method according to claim 14, wherein setting a flow rate (B) passing through the gas permeable portions of said side panels is performed by adjusting a degree of permeability of said gas permeable portions of the side panels.

16. The method according to claim 12, wherein adjusting a degree of permeability comprises providing said gas permeable portions of the side panels with a first plurality of perforations and partially closing said first plurality of perforations.

17. The method according to claim 16, wherein partially closing said first plurality of perforations comprises providing at least one plate having a second plurality of perforations and moving with continuity said at least one plate with respect to said side panels between a minimum permeability condition, wherein said second plurality of perforations are partially superposed and aligned to said first plurality of perforations, and a maximum permeability condition, wherein said second plurality of perforations are centered and aligned to said first plurality of perforations.

18. The method according to claim 16, wherein providing a first plurality of perforations comprises providing said gas permeable portions with a perforation density, calculated as a ratio between perforated areas and not perforated areas, comprised between 0.2% and 15%.

19. A method for manufacturing glass preforms for optical fibers comprising:
providing the apparatus of claim 1 wherein the reaction chamber of the apparatus surrounds a deposition region;
holding a target rod within said deposition region;
directing a high temperature flow of forming glass particles toward said target rod;
providing the hood comprising side panels and an exhaust port for discharging to outside said reaction chamber glass particles not adhered to said target rod;
providing said side panels with gas permeable portions extending for an area of at least 50% of the overall area of said side panels;
maintaining the pressure inside the reaction chamber lower than the pressure outside the reaction chamber;
adjusting a degree of permeability of said gas permeable portions of the side panels.

* * * * *